United States Patent [19]

Morishita et al.

[11] Patent Number: 4,542,462
[45] Date of Patent: Sep. 17, 1985

[54] DEVICE FOR CONTROLLING A VEHICLE CHARGING SYSTEM

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 484,673

[22] Filed: Apr. 13, 1983

[30] Foreign Application Priority Data

| Apr. 13, 1982 | [JP] | Japan | 57-63021 |
| Jun. 19, 1982 | [JP] | Japan | 57-106405 |
| Jun. 19, 1982 | [JP] | Japan | 57-106408 |
| Jun. 19, 1982 | [JP] | Japan | 57-106412 |
| Jun. 19, 1982 | [JP] | Japan | 57-106414 |

[51] Int. Cl.$^4$ .......................... G06F 15/20; H02J 7/32
[52] U.S. Cl. ..................... 364/424; 320/32; 320/43; 364/431.01
[58] Field of Search ............. 364/424, 431.01, 431.03, 364/431.04, 431.05, 431.1, 431.11, 431.12; 320/30, 31, 32, 35, 39, 43, 48, 61, 62; 322/22-25, 28, 33, 34, 38; 290/10, 14, 16, 17, 50, 51

[56] References Cited

U.S. PATENT DOCUMENTS

| 3,719,881 | 3/1973  | Shibata et al.    | 290/17 X |
| 4,229,687 | 10/1980 | Newman            | 320/35 X |
| 4,290,109 | 9/1981  | Taniguchi et al.  | 320/32 X |
| 4,306,156 | 12/1981 | Monaco et al.     | 290/16 X |
| 4,308,492 | 12/1981 | Mori et al.       | 320/35 X |
| 4,313,080 | 1/1982  | Park              | 320/61   |

Primary Examiner—Joseph Ruggiero
Attorney, Agent, or Firm—Sughrue, Mion, Zinn, Macpeak, and Seas

[57] ABSTRACT

A vehicle charging control system includes a charging control microcomputer for performing arithmetic operations upon input engine or charging system parameters to derive the most proper operating voltage for the charging system. The voltage regulator includes a comparator which receives its reference voltage from the charging control microcomputer. An engine control microcomputer which controls, for example, the air/fuel ratio also outputs data to the charging control microcomputer for use thereby in controlling the reference voltage. The charging control microcomputer may perform diagnostics on the charging system and output the results thereof to a suitable indicator.

8 Claims, 6 Drawing Figures

DEVICE FOR CONTROLLING A VEHICLE CHARGING SYSTEM

BACKGROUND OF THE INVENTION

The present invention relates to a device for controlling a charging system including a generator driven by the internal combustion engine of a vehicle.

Conventional devices for controlling vehicle charging systems are constructed such that the voltage with which a vehicle-carried storage battery is charged is generally controlled to a preset level by a voltage regulator coupled to a generator driven by the internal combustion engine. The voltage regulator may have a temperature compensation circuit for compensating temperature-dependent variations in the charging characteristics of the storage battery. In many instances, the preset voltage level is temperature-compensated with a negative temperature gradient with respect to variations in ambient temperature around the voltage regulator, thereby effecting relative correction of temperature dependent charging characteristics of the storage battery.

The storage battery and the voltage regulator have widely different thermal capacities and are located at different positions. This tends to impair the correlation between their temperature changes, making it difficult to control the output voltage of the generator so as to agree with the optimum charging voltage of the storage battery. Furthermore, since the generator is driven by an internal combustion engine, it is difficult to change, by way of an external approach, the setting for the storage battery voltage in order to reduce the load on the internal combustion engine when the vehicle is accelerated, or decelerated. The charging characteristics of the storage battery are also variable due to changes in its internal resistance during use. Accordingly, complete compensation is not possible based on temperature characteristics that have been fixedly set in advance. It would be highly difficult to perform optimum control of the charging system in a manner so as to meet the characteristics of various types of vehicles and the running patterns thereof.

SUMMARY OF THE INVENTION

The present invention has been provided to solve the prior problems described above. It is an object of the present invention to provide a device for controlling the charging system of a vehicle by detecting or reading the running condition of the internal combustion engine and the conditions of various portions of the charging system at predetermined intervals, and for effecting preset arithmetic operations to exercise optimum control over the internal combustion engine and the charging system, and for diagnosing the condition of the charging system and indicating the diagnosis made of the charging system.

DETAILED DESCRIPTION OF THE PREFERRED EMBODIMENTS

Figure 1:
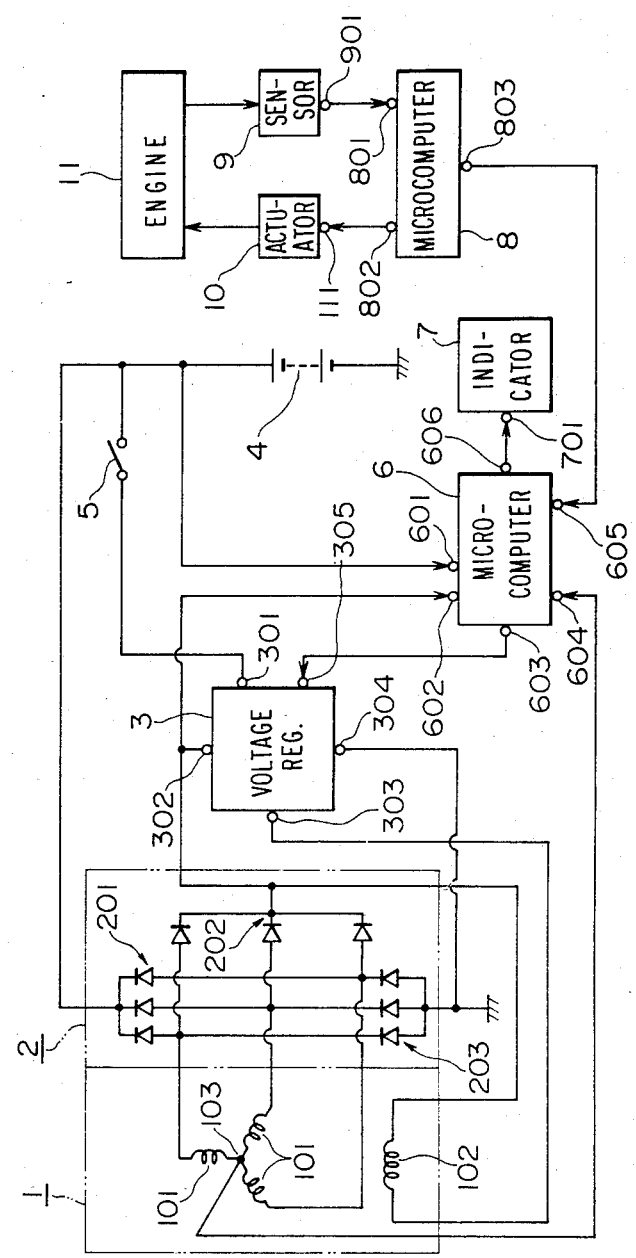
FIG. 1 is a block diagram of a device for controlling a charging system according to one embodiment of the present invention.

An embodiment of the present invention will now be described with reference to the drawings. As illustrated in FIG. 1, a three-phase AC generator 1 driven by an internal combustion engine 11 has star-connected three-phase armature coils 101, a field coil 102, and a neutral point 103 from which information on the generated voltage can be picked up. The AC output from the generator 1 is rectified by a full-wave rectifier 2 having first and second output terminals 201, 202 and a ground terminal 203. The output voltage of the generator 1 is controlled to a preset level by a voltage regulator 3 through control of the field current flowing through the field coil 102. The voltage regulator 3 has an initial excitation terminal 301, a voltage detection terminal 302, a field coil terminal 303, a ground terminal 304, and an external control terminal 305.

Figure 2:
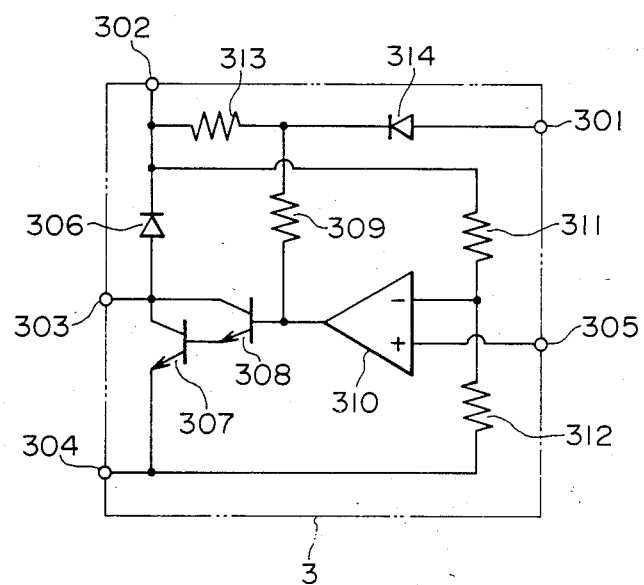
FIG. 2 is a circuit diagram of a voltage regulator of the device shown in FIG. 1.

FIG. 2 shows the detailed circuit arrangement of the voltage regulator 3. The voltage regulator 3 is composed of diodes 306, 314, transistors 307, 308, resistors 309, 311, 312, 303, and a comparator 310. Designated in FIG. 1 at 4 is an ordinary storage battery for use on the vehicle, and 5, a key-operated switch.

A microcomputer 6 for controlling the charging system is capable of effecting predetermined arithmetic operations based on at least one of a number of items of information, including that supplied by an engine control microcomputer 8 (described later), information on the voltage across the terminals of the storage battery 4, and information on the generated voltage, to thereby generate an external control reference signal for externally setting the control voltage of the voltage regulator 3. The microcomputer 6 also serves to diagnose the charging system for any failure thereof based on information regarding the voltage at the neutral point, and to indicate this diagnosis on an indicator unit 7. The microcomputer 6 has an input terminal 601 for receiving the voltage across the terminals of the storage battery 4, an input terminal 602 for receiving the voltage at the second output terminal 202, an output terminal 603 for issuing the external control reference signal, an input terminal 604 for receiving the voltage from the neutral point 103, an input terminal 605 for receiving information from the engine control microcomputer 8, and an output terminal 606 for delivering an indicator signal to the indicator unit 7.

An engine control microcomputer 8 has a sensor signal input terminal 801 for receiving a signal from the output terminal 901 of a sensor 9 which detects the operating conditions of the internal combustion engine 11. An output indicative of the result of predetermined processing of the sensor signal is supplied from a control signal output terminal 802 of the engine control microcomputer 8 to an input terminal 111 of an actuator 10. The engine control microcomputer 8 also has an information output terminal 803 for delivering information to the microcomputer 6. The actuator 10 is responsive to the control signal from the engine signal microcomputer 8 to drive a fuel injection control value and an air control valve, for example, to control the operating conditions of the engine 11.

The microcomputers 6, 8 contain A/D converters for receiving analog signals. When computers with no A/D converters are employed, A/D converters should be connected as peripheral units to such computers.

The operation of the device of the invention thus constructed will now be described. When the key-operated switch 5 is closed in starting the engine 11, an initial excitation current flows from the storage battery 4 through the key-operated switch 5, the initial excitation terminal 301 and voltage detection terminal 302 of the voltage regulator 3, the field coil 102, the field coil terminal 302 and ground terminal 304 of the voltage regulator 3, to ground. The field coil 102 thus energized induces a magnetomotive force.

More specifically, as shown in FIG. 2, the initial excitation current flows from the terminal 301 through the diode 314 and the resistor 303 to the terminal 302. The initial excitation current then flows through the field coil 102 to the terminal 303, from which the current goes through the transistor 307 and the terminal 304 to ground. When the voltage at the terminal 302 is increased or the voltage at the terminal 305 is reduced, the output from the comparator 310 is inverted, rendering the transistors 308, 307 successively nonconductive. Therefore, the connection between the terminals 303, 304 is cut out.

At the same time that the key-operated switch 5 is closed, the microcomputers 6, 8, the indicator unit 7, the sensor 9 and the actuator 10 are supplied with a prescribed power supply voltage from the storage battery 4 and start operating. Immediately after the key-operated switch 5 has been closed, the sensor 9 detects the conditions of the engine 11, such as temperature, water level and the like, and enters the corresponding items of information into the engine control computer 8. The microcomputer 8 is responsive to the items of information supplied from the sensor 9 to effect predetermined arithmetic operations on the supplied items of information to derive an optimum air-fuel ratio for starting the engine 11, and for outputting data on the optimum air-fuel ratio to the actuator 10. The engine control microcomputer 8 also supplies information representative of the condition of the engine 11 through the information output terminal 803 to the microcomputer 6. The microcomputer 6 carries out prescribed arithmetic operations based on various items of information fed to the terminals 601, 602, 604, 605 and issues, through the terminal 603, a signal which determines a setting for the voltage regulator 3 so as to provide conditions optimum for the starting of the engine 11.

When the engine 11 starts operating in response to a start operation, the generator 1 is driven by the engine 11 to cause AC outputs to be induced across the armature coils 101 dependent upon the RPM of the generator 1. The AC outputs thus generated are then rectified by the full-wave rectifier 2. The microcomputer 6 controls the field current flowing through the field coil 102 in order to bring the rectified output voltage to a prescribed setting. More specifically, the microcomputer 6 effects predetermined arithmetic operations on engine information fed from the engine control computer 8 and various pieces of information indicative of the conditions of portions of the charging system. Then, the microcomputer 6 delivers a reference voltage for setting an optimum voltage for the engine and the charging system from the terminal 603 to the external control terminal 305 of the voltage regulator 3. The voltage at the terminal 305 is compared with the charging voltage by the comparator 310 (FIG. 2), and the transistors 308, 307 are controlled by the result of such comparison to control the field current passing through the field coil 102.

The microcomputer 6 is also capable of diagnosing the charging system for various failures such, for example, as an overvoltage, no power generation, and breakage of the wiring on the vehicle body. The failure diagnosis is performed as follows: When the microcomputer 6 starts operating in response to the turn-on of the key-operated switch 5, the microcomputer 6 operates cyclically to convert the analog signals from the terminals 601, 602, 604 into digital signals and compare these digital signals with values stored in a memory in the microcomputer 6. If the results of such comparison are indicative of failure conditions, a coded failure signal is fed to the indicator unit 7. The indicative unit 7 is responsive to the signal from the microcomputer 6 to visibly indicate the failure diagnosis with a figure or characters, or to audibly indicate the failure diagnosis with sound or synthesized speech.

While in the foregoing embodiment information regarding the generated voltage is picked up from the neutral point 103 of the armature coils 101, it may similarly be picked up from the second output terminal 202 of the full-wave rectifier or the output terminal of each armature coil 101.

Figure 3:
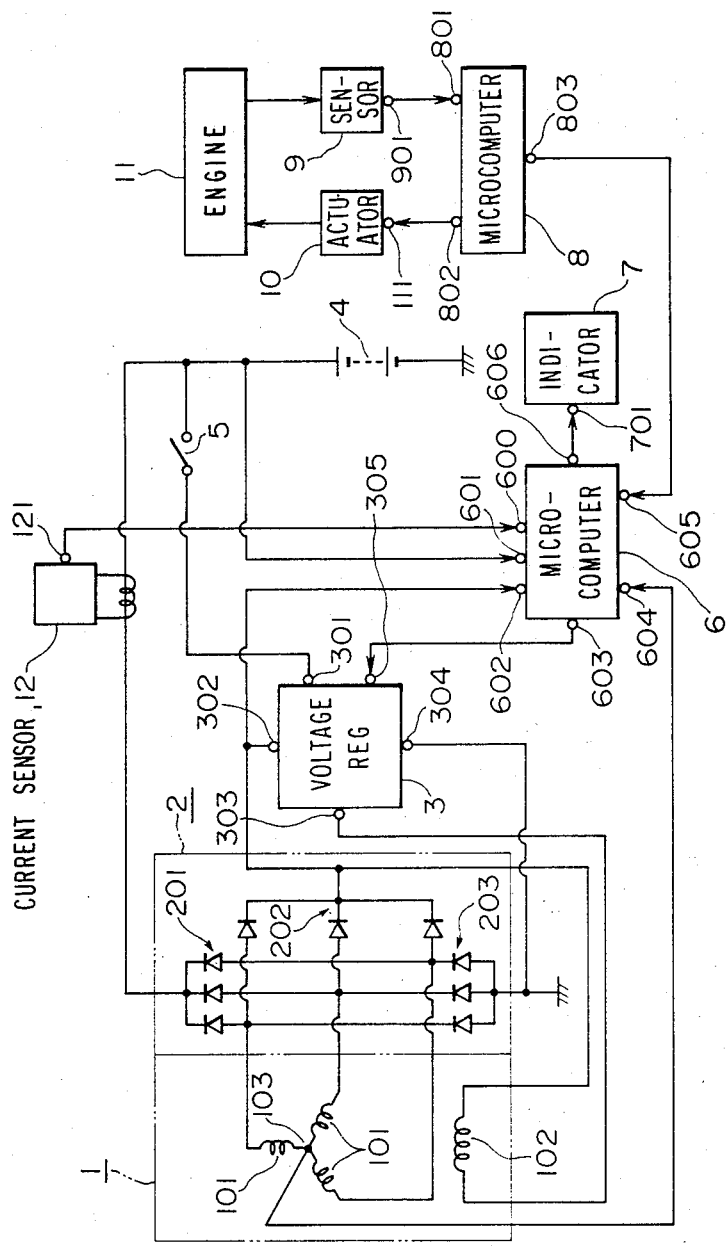
FIGS. 3 and 4, 5 and 6 are block diagrams of charging system controlling devices according to other embodiments of the present invention.

According to another embodiment shown in FIG. 3, an output current sensor 12 is added to the circuit arrangement illustrated in FIG. 1. When the key-operated switch 5 is closed, a prescribed power supply voltage is supplied to the output current sensor 12, which then starts to operate. The output current sensor 12 then detects an output current flowing from the full-wave rectifier 2 to the storage battery 4, and delivers a detection signal from an output terminal 121 to an input terminal 600 of the microcomputer 6.

Figure 4:
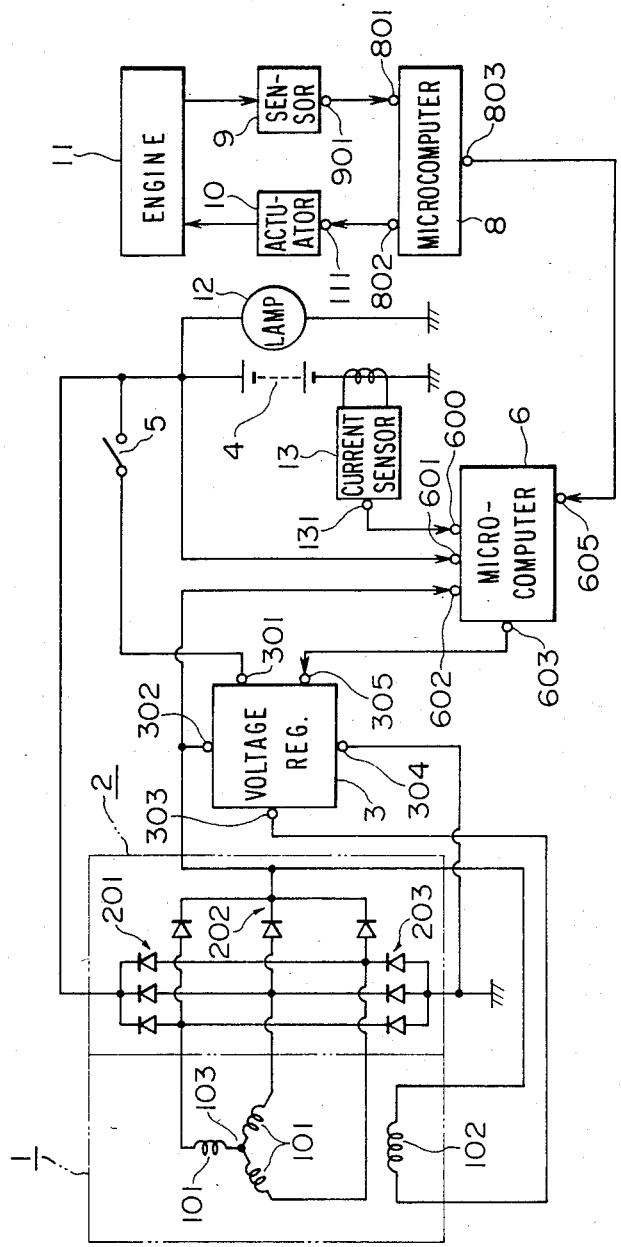

FIG. 4 shows a still another embodiment in which a battery terminal current sensor 13 is added to the device shown in FIG. 1. The battery terminal current sensor 13 serves to detect current flowing through a terminal of the storage battery 4 and delivers a detection signal from an output terminal 131 to an input terminal 600' of the computer 6. In the embodiment of FIG. 4, information on the generated voltage is picked up from the second output terminal 202 of the full-wave rectifier 2.

Figure 5:
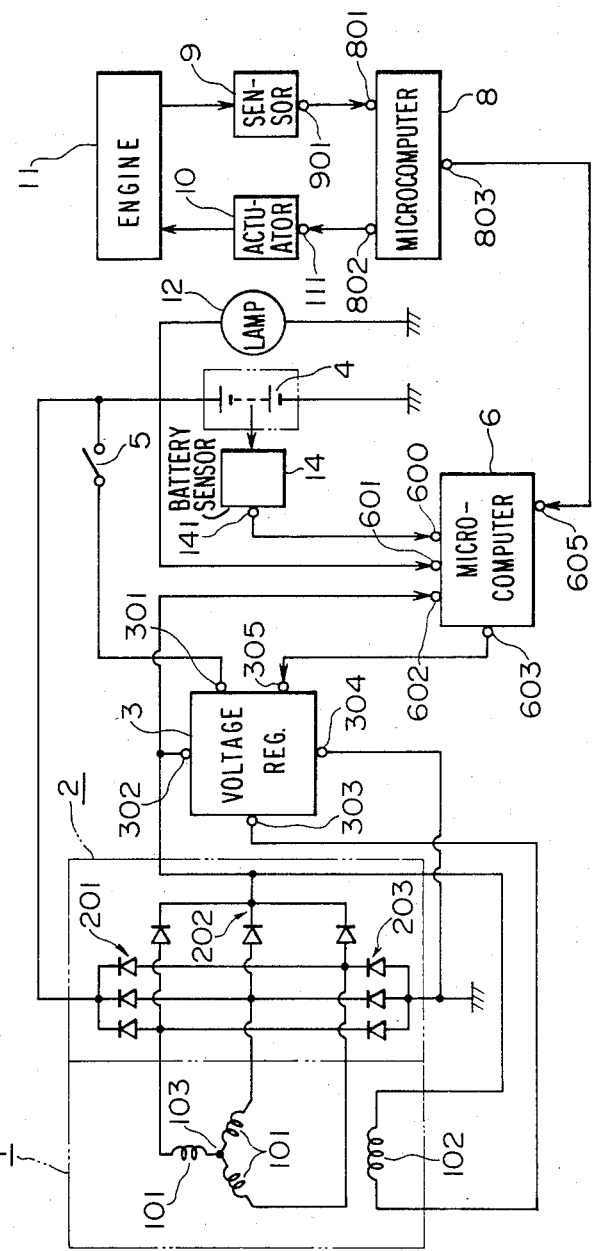

FIG. 5 is illustrative of a circuit arrangement according to a still further embodiment, in which a battery sensor 14 is added to the arrangement of FIG. 1. The battery sensor 14 serves to detect the temperature, specific gravity, acidity or the like of an electrolyte in the storage battery 4, and issues an electric signal indicative of the detected quantity from an output terminal 131 to an input terminal 600'' of the microcomputer 6.

Figure 6:
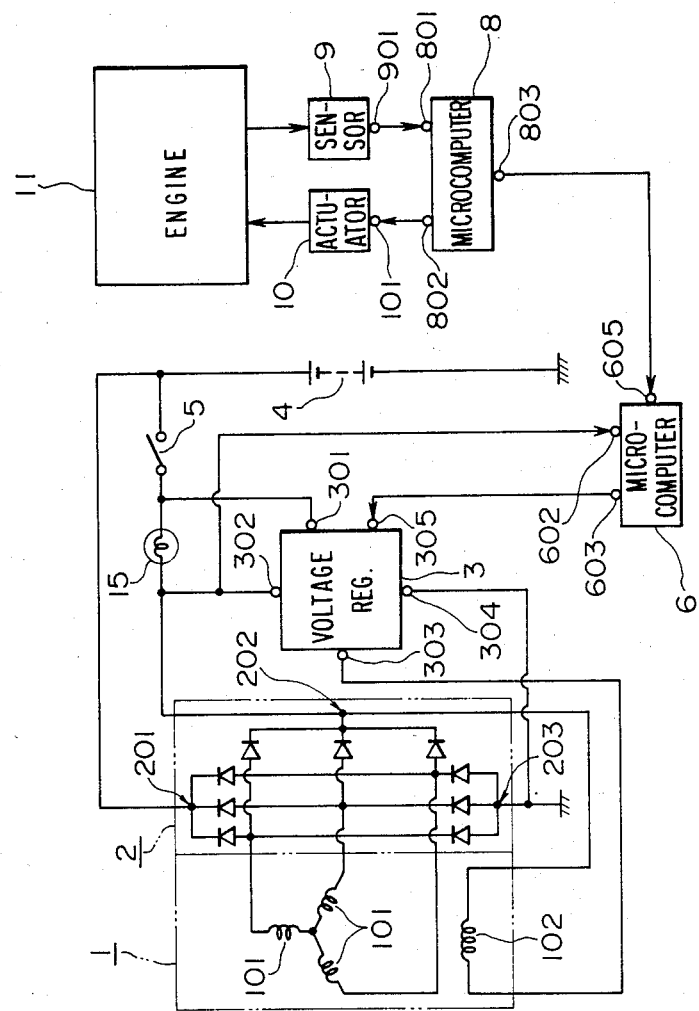

As shown in FIG. 6, an indicator lamp 15 may be provided for indicating the charging condition of the storage battery 4.

With the present invention, as described above, engine information, information regarding charging and discharging currents for the storage battery, information regarding the voltage across the terminals of the storage battery, and information regarding the voltage generated by the generator are read at prescribed cyclic intervals into the engine control microcomputer and the charging system control microcomputer. Based on the results of predetermined arithmetic operations effected by the microcomputers, the internal combustion engine and the generator can be controlled so as to be brought into optimum conditions on a real-time basis. The performance of the internal combustion engine and the fuel economy thereof can be improved, while at the same time the charging system may be controlled to operate stably. Furthermore, the operating conditions of various system portions can be monitored and diagnosed failures can be indicated. This allows stable control and easy maintenance of the charging system.

What is claimed is:

1. In a device for controlling a vehicle charging system including a generator driven by an engine, a voltage regulator for controlling said generator to bring an AC output of the generator into agreement with a prescribed value based on a reference voltage, and a storage battery chargeable by a DC output from a rectifier, the improvement comprising sensor means for detecting engine information, an engine control microcomputor responsive to an information signal from said sensor for effecting an arithmetic operation on the information signal to issue a control signal for providing optimum operating conditions of the engine, a charging system control microcomputer for reading an output signal from said engine control microcomputer and signals indicative of conditions at a plurality of positions in said charging system, for effecting prescribed arithmetic operations on the signals thus read to effect optimum control to optimize said reference voltage used for controlling said AC output.

2. A device according to claim 1, and further including an output current sensor for detecting a current flowing through a line interconnecting said rectifier and said storage battery.

3. A device according to claim 1, and further including a battery sensor for detecting a current flowing through a terminal of said storage battery.

4. A device according to claim 1, and further including a battery sensor for detecting an electrochemical condition of said storage battery.

5. A device according to claim 1, and further including an indicator lamp for indicating the charging condition of said storage battery.

6. A device according to claim 1, said charging system control microcomputer further effecting a charging system diagnostic operation, and indicator means for indicating the results of said diagnostic operation.

7. A device according to claim 1, further including air/fuel ratio control means operated in response to said control signal output by said engine control microcomputer.

8. A device according to claim 1, said regulator including comparator means for controlling the value of said prescribed value, a reference voltage signal for said comparator being supplied by said charging system control microcomputer.

* * * * *